United States Patent
Ahmad et al.

(10) Patent No.: US 8,390,949 B2
(45) Date of Patent: Mar. 5, 2013

(54) DATA LOSS PREVENTION DURING A FALL OF A STORAGE DEVICE

(75) Inventors: Munir Ahmad, Austin, TX (US); Kevin Mundt, Austin, TX (US); Andrew Thomas Sultenfuss, Leander, TX (US); Thomas W. Studwell, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 371 days.

(21) Appl. No.: 12/771,680

(22) Filed: Apr. 30, 2010

(65) Prior Publication Data

US 2010/0290145 A1    Nov. 18, 2010

Related U.S. Application Data

(63) Continuation-in-part of application No. 12/467,788, filed on May 18, 2009, now Pat. No. 8,074,016.

(51) Int. Cl.
*G11B 21/12* (2006.01)

(52) U.S. Cl. ............................................. 360/75; 360/60

(58) Field of Classification Search ........................ None
See application file for complete search history.

(56) References Cited

U.S. PATENT DOCUMENTS

| | | | |
|---|---|---|---|
| 5,227,929 A | 7/1993 | Comerford | |
| RE35,269 E | 6/1996 | Comerford | |
| 5,654,840 A | 8/1997 | Patton et al. | |
| 5,982,573 A | 11/1999 | Henze | |
| 6,046,877 A | 4/2000 | Kelsic | |
| 7,310,196 B1 * | 12/2007 | Schreck et al. | 360/75 |
| 7,369,345 B1 | 5/2008 | Li et al. | |
| 2006/0010458 A1 * | 1/2006 | Georgis | 720/600 |
| 2007/0109679 A1 | 5/2007 | Han et al. | |
| 2007/0146924 A1 * | 6/2007 | Nishioka | 360/75 |
| 2007/0159710 A1 | 7/2007 | Lucas et al. | |

OTHER PUBLICATIONS http://www.interfacebus.com/SATA_Pinout.html, Apr, 13, 2010.

* cited by examiner

*Primary Examiner* — Hoa T Nguyen
*Assistant Examiner* — James L Habermehl
(74) *Attorney, Agent, or Firm* — Haynes and Boone, LLP

(57) ABSTRACT

A data storage circuit includes a hard disk drive (HDD) and a fall sensor. The HDD includes a rotatable media platter operable to receive and store data; a read/write head operable to communicate with the media platter by writing data to the media platter and by reading the data from the media platter; an arm supporting the read/write head; a motor coupled to the arm and operable to move the arm to and from the media platter; a drive controller operable to control the media platter, the read/write head and the servo motor; a general purpose input/output (GPIO) terminal coupled to the drive controller; and a data interface terminal coupled to the drive controller. The fall sensor is communicatively coupled to the drive controller and is configured to send an interrupt trigger signal to the drive controller when the drive is falling. The interrupt trigger signal is sent via the GPIO terminal when the HDD is free fall sense enabled and the interrupt trigger signal is sent via the data interface terminal when the HDD is not free fall sense enabled.

20 Claims, 10 Drawing Sheets

| SATA PinOut, DATA |||
|---|---|---|
| PIN # | SIGNAL NAME | SIGNAL DESCRIPTION |
| 1 | GND | GROUND |
| 2 | A + | TRANSMIT + |
| 3 | A - | TRANSMIT - |
| 4 | GND | GROUND |
| 5 | B - | RECEIVE - |
| 6 | B + | RECEIVE + |
| 7 | GND | GROUND |
| SATA PinOut, POWER |||
| PIN # | SIGNAL NAME | SIGNAL DESCRIPTION |
| 1 | V33 | 3.3v POWER |
| 2 | V33 | 3.3v POWER |
| 3 | V33 | 3.3v POWER, PRE-CHARGE, 2ND MATE |
| 4 | GROUND | 1ST MATE |
| 5 | GROUND | 2ND MATE |
| 6 | GROUND | 3RD MATE |
| 7 | V5 | 5v POWER, PRE-CHARGE, 2ND MATE |
| 8 | V5 | 5v POWER |
| 9 | V5 | 5v POWER |
| 10 | GROUND | 2ND MATE |
| 11 | RESERVED | DEVICE ACTIVITY SIGNAL/ DISABLE STAGGERED SPINUP/ CACHE DATA, PARK HEAD |
| 12 | GROUND | 1ST MATE |
| 13 | V12 | 12v POWER, PRE-CHARGE, 2ND MATE |
| 14 | V12 | 12v POWER |
| 15 | V12 | 12v POWER |

Fig. 4

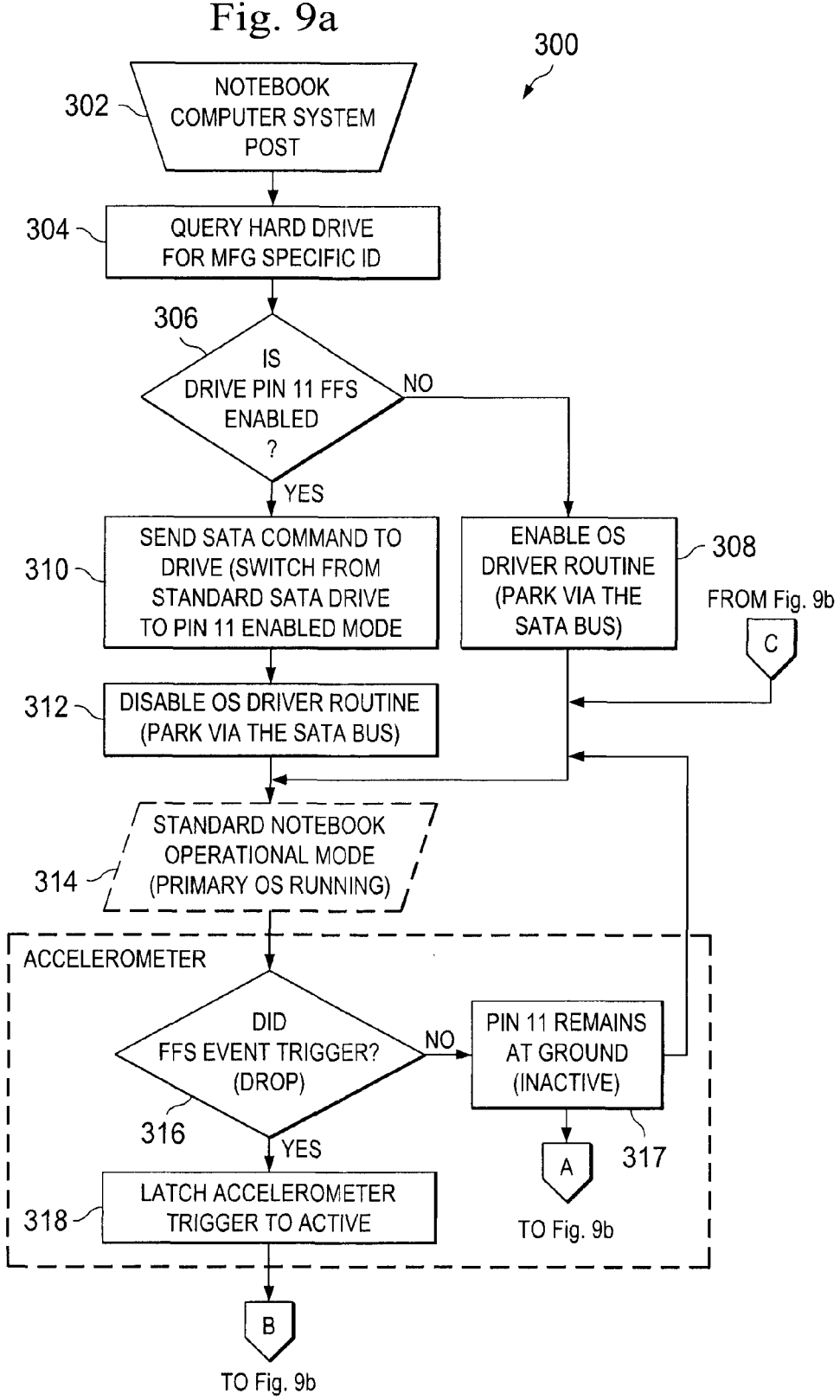

DATA LOSS PREVENTION DURING A FALL OF A STORAGE DEVICE

This disclosure is a continuation-in-part of U.S. patent application Ser. No. 12/467,788, filed on May 18, 2009, and entitled Data Loss Prevention During A Fall Of A Storage Device, the disclosure of which is incorporated herein by reference in its entirety.

BACKGROUND

The present disclosure relates generally to information handling systems, and more particularly to protection and data loss prevention of data and data storage devices during a fall of the information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In the ever-growing mobile society, many of the IHSs today are mobile, notebook-type IHSs. With this mobility, there comes a risk of the IHS being dropped. Hard disk drives (HDDs) in notebook computers are susceptible to mechanical shock and damage from falls, drops or other high-shock events. As should be understood, an HDD read/write head positioned over a data storage platter may crash into the surface of the platter upon impact of the IHS/HDD and either corrupt the data and/or make the HDD unusable. This can result in physical damage to the read/write head of the HDD, damage to the rotating media platter(s), damage to the data storage on the rotating media platter(s) and/or damage to the data in process of being read from or written to the HDD near the time of the shock.

To combat this, some higher-end HDDs (e.g., 7200 rpm HDDs) incorporate an accelerometer sensor within the HDD to detect a free fall of the device. See FIG. 6. Upon detection of a fall event by the sensor, the HDD initiates an emergency routine by communicating from the internal drop sensor to the drive controller via an internally coupled general purpose input/output (GPIO). The emergency routine stores the data being transferred to/from the HDD and parks the drive read/ write head. However, having the drop sensor internal to the HDD device, does not allow for the sensor to be used by IHS applications for other purposes, such as for gaming applications. Also, due to increased cost, these integrated, internal sensors have not become common in the lower-end, commodity drives (e.g., 5400 or 4200 rpm HDDs). However, there is a need for free fall protection in all notebook HDD products to protect the data and the HDDs. Also, because a "HEAD PARK EVENT" is generally controlled by a device manufacturer, when a fall happens, each device in an IHS may behave differently and unpredictably.

Another solution for IHS free fall sensing is to place a drop sensor external to the HDD (e.g., on the motherboard of the IHS). See FIG. 7. When a fall event is detected by the sensor, the system sends a drive "idle immediate with unload" command via the standard SATA communication data path interface to the HDD drive controller. This solution, using a sensor external to the HDD and communicating via the standard SATA communication data path interface is very slow in comparison to the internal sensor system due to communication protocol for the standard SATA interface. For example, the internal sensor model discussed above with respect to FIG. 6 provides a maximum 160 ms response time, or approximately 5" worth of fall for the HDD to react (typical minimum depends on how fast the HDD device can park). To the contrary, this external sensor system using the standard SATA communication data path interface provides an approximately 300 ms response time. As such, the time interval between recognizing that the device is falling and the emergency response on this system may not perform the drive read/write head park before the IHS impacts a surface if the fall is approximately 18" or greater.

As should be understood, the intent of the emergency routines discussed above is to immediately move the HDD read/ write head away from the data storage platter(s) before the IHS/HDD impacts a surface. Data integrity and mechanical shock protection of a HDD is increased with the addition of a free fall sensor. However, a problem with the system shown in FIG. 6 is that this type of system tends to be incorporated only in high performance drives and the sensor is integrated internally into the HDD, wherein the sensor data is limited to use within the HDD (e.g., the data cannot be utilized in a real time fashion by the IHS for other system level purposes). Also, because "HEAD PARK EVENT" is generally controlled by a device manufacturer, when a Fall happens, each device in an IHS may behave differently and unpredictably. A problem with the system shown in FIG. 7 is that the response time is comparatively very slow and there may not be any protection against data loss in the event HDD falls from a drop height of less than 18" in a IHS.

Accordingly, it would be desirable to provide for improved data storage device fall protection, absent the deficiencies discussed above.

SUMMARY

According to one embodiment, a data storage circuit includes a hard disk drive (HDD) and a fall sensor. The HDD includes a rotatable media platter operable to receive and store data; a read/write head operable to communicate with the media platter by writing data to the media platter and by reading the data from the media platter; an arm supporting the read/write head; a motor coupled to the arm and operable to move the arm to and from the media platter; a drive controller operable to control the media platter, the read/write head and the servo motor; a general purpose input/output (GPIO) terminal coupled to the drive controller; and a data interface terminal coupled to the drive controller. The fall sensor is communicatively coupled to the drive controller and is configured to send an interrupt trigger signal to the drive controller when the drive is falling. The interrupt trigger signal is sent via the GPIO terminal when the HDD is free fall sense enabled and the interrupt trigger signal is sent via the data interface terminal when the HDD is not free fall sense enabled.

BRIEF DESCRIPTION OF THE DRAWINGS

FIG. 4 illustrates a table showing standard pin definitions for SATA data storage devices (e.g., an HDD), and adding a new definition for pin 11 according to an embodiment of the present disclosure.

FIGS. 9a and 9b illustrate a flowchart of an embodiment of a method to protect data and a data storage device during a fall of an IHS having dual path sensing according to an embodiment of the present disclosure.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
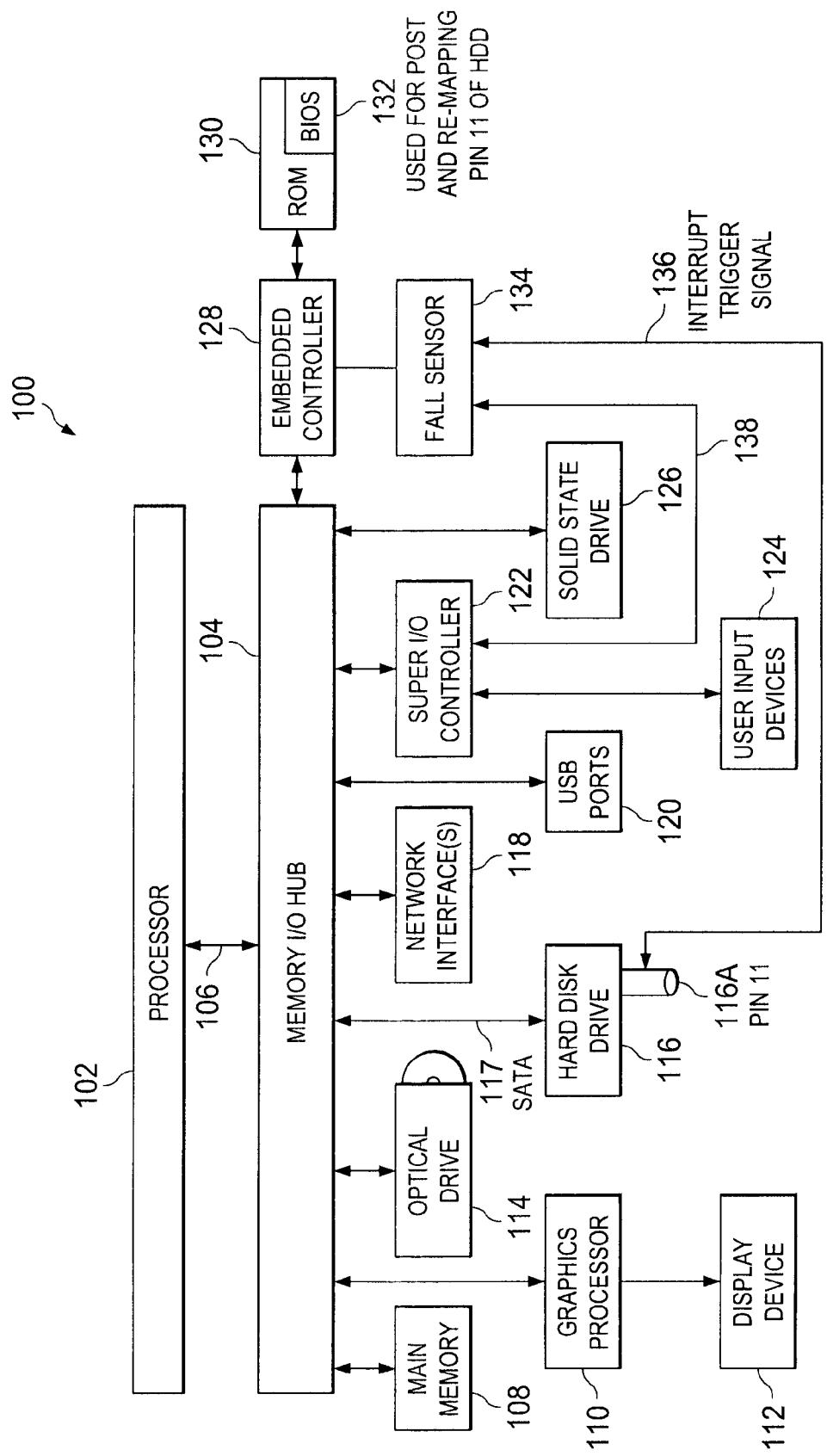
FIG. 1 illustrates an embodiment of an information handling system (IHS) according to an embodiment of the present disclosure.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. The frontside bus 106 may also be known as a North Bridge. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives (HDD) 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100. Traditional hard disk drives are commonly known in the art and the general workings of which are not repeated here for brevity. In an embodiment, the HDD 116 is a Serial Advanced Technology Attachment (SATA) type hard disk drive. SATA is a common standard of communication and is generally understood as a computer bus storage-interface for coupling data storage devices, such as the HDD 116, with an IHS, such as the IHS 100. In an embodiment, the data bus 117 is a SATA communication bus. The SATA standard traditionally uses connection pin definitions shown in FIG. 4. However, it is noted that the pin definition chart shown in FIG. 4 modifies the traditional SATA connection pin definitions by providing a new definition 194 for the use of connection pin 11, 116A, which is a general purpose input/output (GPIO), to be used for an emergency interrupt trigger routine, as will be described in more detail below.

An embodiment of the IHS 100 also includes an embedded controller 128 coupled with the memory I/O hub 104. The embedded controller 128 operates to help direct communications via the memory I/O hub 104. In addition, the embedded controller 128 couples with read only memory (ROM) 130. The ROM 130 stores information used by the IHS 100, and includes the basic input/output system (BIOS) 132. As should be understood, the BIOS 132 may be used for starting operations of the IHS 100, such as a power-on self-test (POST). In addition, the BIOS 132 of the present disclosure may be used for re-defining the uses of pin 11, 116A (e.g., the definition 194 shown in FIG. 4) of the HDD 116, as will be described in more detail below.

Figure 5:
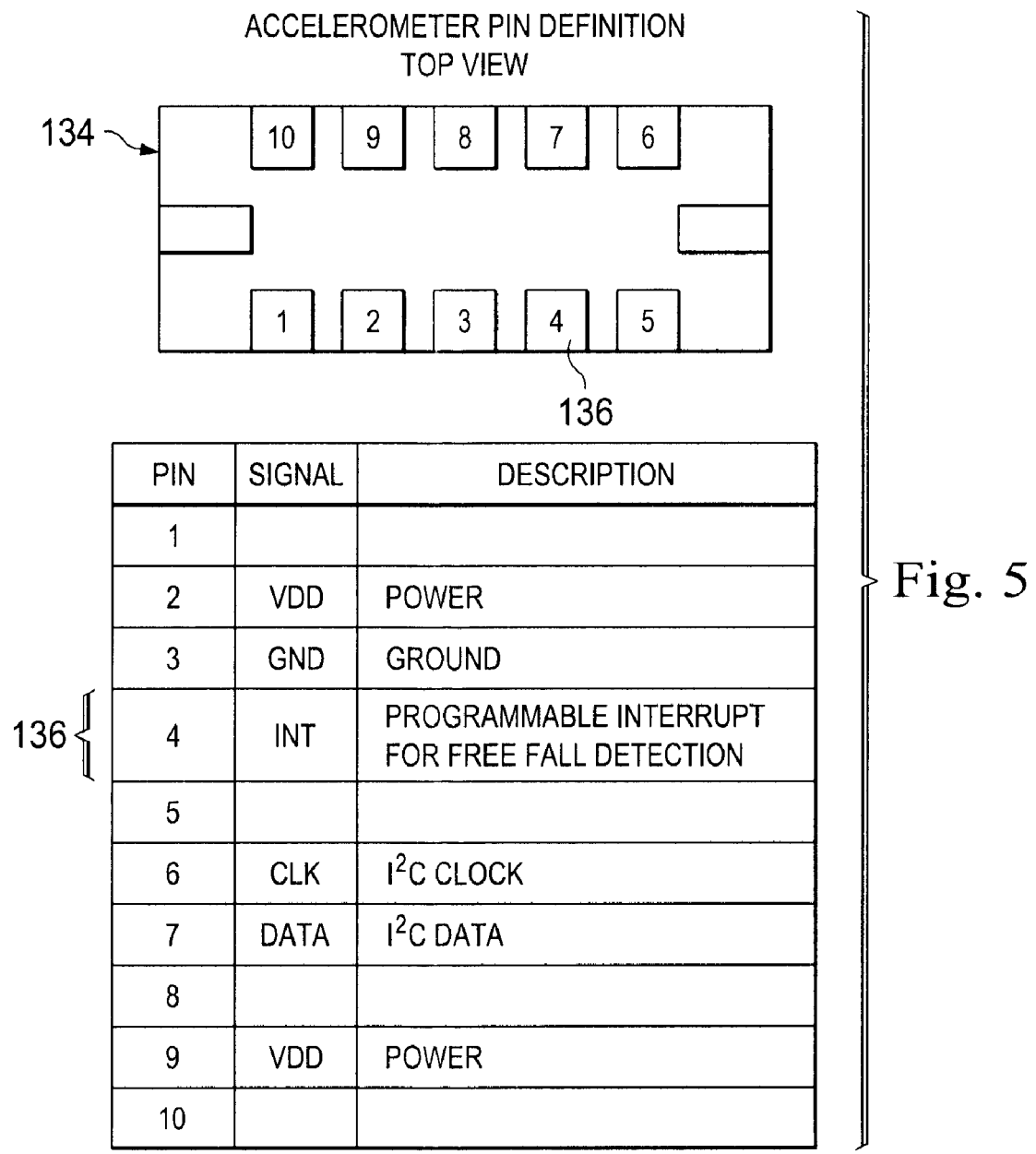
FIG. 5 illustrates an embodiment of an accelerometer operable for use as a drop sensor coupled with an IHS according to an embodiment of the present disclosure.

In addition, an embodiment as shown in FIG. 1 includes a fall sensor 134 coupled with the embedded controller 128. In an embodiment, the fall/drop sensor 134 is a three-axis accelerometer operable to determine acceleration/orientation of the sensor 134 along three directions represented by each axis. A pin-out diagram of an embodiment of the fall sensor 134 is shown in FIG. 5. Other pin-outs and other embodiments of accelerometers may be used as the fall sensor 134. Additionally, other types of fall sensors may be used with the present disclosure. Using an accelerometer as the sensor 134, one can determine if the sensor 134 is in free fall when the each of the axis' values approach zero. The fall sensor 134 also includes an interrupt trigger signal 136 that, in an embodiment, communicatively couples with GPIO pin 11, 116A of the HDD 116. It should be understood by those having ordinary skill in the art the any GPIO of the HDD 116 may be used with embodiments of the present disclosure.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
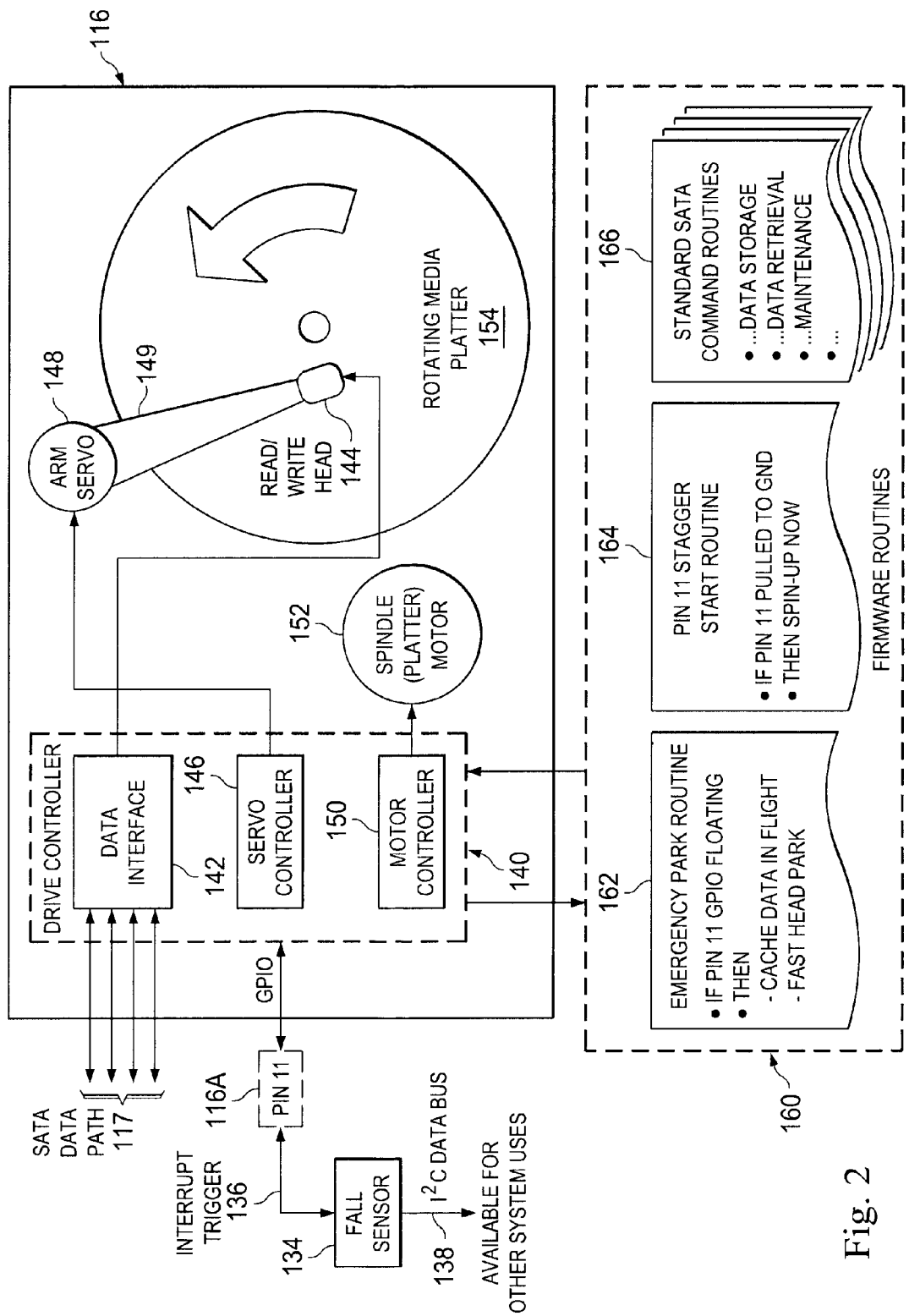
FIG. 2 illustrates a block diagram of an embodiment of a hard disk drive (HDD) coupled with an external drop sensor to sense falling of an IHS according to an embodiment of the present disclosure.

FIG. 2 illustrates a block diagram of an embodiment of a hard disk drive (HDD) 116 coupled with an external drop sensor 134 to sense falling of the IHS 100. The embodiment shown in FIG. 2 is illustrated using a hard disk drive. However, any device having moving parts and is subject to damage upon a sudden shock may benefit from the present disclosure. The HDD 116 includes a drive controller 140 for controlling operations of the HDD 116, including reading and writing data to and from the HDD 116. A data interface 142 couples the HDD 116 to the IHS 100 via the SATA communication bus 117. The communication on the bus 117 may be traditional SATA communication, as should be understood in the art. The communication on the bus 117 may include serial and/or parallel communication. The data interface 142 communicates information to and from the read/write head 144. As should be understood, the read/write head 144 writes and reads information to and from the one or more rotating media platters 154. The rotating media platter 154 may be magnetic, optical or some other type of data storage medium. A servo controller 146 couples with an arm servo 148 to move the arm 149. Moving the arm 149 allows the head 144 to communicate information to different locations on the media platter 154. A motor controller 150 controls operation of a spindle motor 152. Spinning the motor 152 causes the rotating media platter 154 to rotate. With the rotating media platter 154 and the moving arm 149, information can be communicated to and from a large portion of the surface of the media platter 154. Any number of read/write heads 144, arm servos 148, arms 149, motors 152, and/or media platters 154 may be used in the HDD 116.

In an embodiment, the HDD 116 couples with the fall sensor 134 via a GPIO 116 of the drive controller 140. If the IHS 100 is dropped or otherwise falls, the fall sensor 134 detects this falling and sends an emergency interrupt trigger signal 136 to the GPIO input 116A of the HDD 116. This emergency interrupt trigger signal 136 bypasses the traditional SATA communication bus 117 and is thus much faster to reach the drive controller 140 to activate an emergency park routine. In an embodiment, the pin 4 programmable interrupt 136 of the fall sensor 134 couples with the pin 11 GPIO 116A of the HDD 116. In an embodiment, the fall sensor 134 may include one or more additional outputs for communicating with the IHS 100 for allowing the sensor 134 to be utilized in other applications, such as gaming applications. In an embodiment, an I²C data bus 138 is used to couple the sensor 134 with the super I/O controller 122. I²C is also known as the Inter-Integrated Circuit communication standard (e.g., I²C) and is used for coupling peripheral devices with an IHS 100 motherboard, embedded system, or other similar devices.

After an initial start-up power-on self-test (POST) of the IHS 100 the BIOS 132 may re-map or re-define the operation of the HDD 116 in response to an input received on the GPIO (e.g., pin 11) 116A of the HDD 116 so that the drive controller 140 recognizes the interrupt trigger 136 as an emergency. After receiving the interrupt trigger 136, the drive controller 140 immediately caches in memory any information in flight to and/or from the HDD 116 and orders the arm servo 148 to park the arm 149 away from the media platter 154. As such, the arm 149 and/or the head 144 are less likely to damage the media platter 154 and/or to damage information stored on the platter 154 or in flight.

Figure 6:
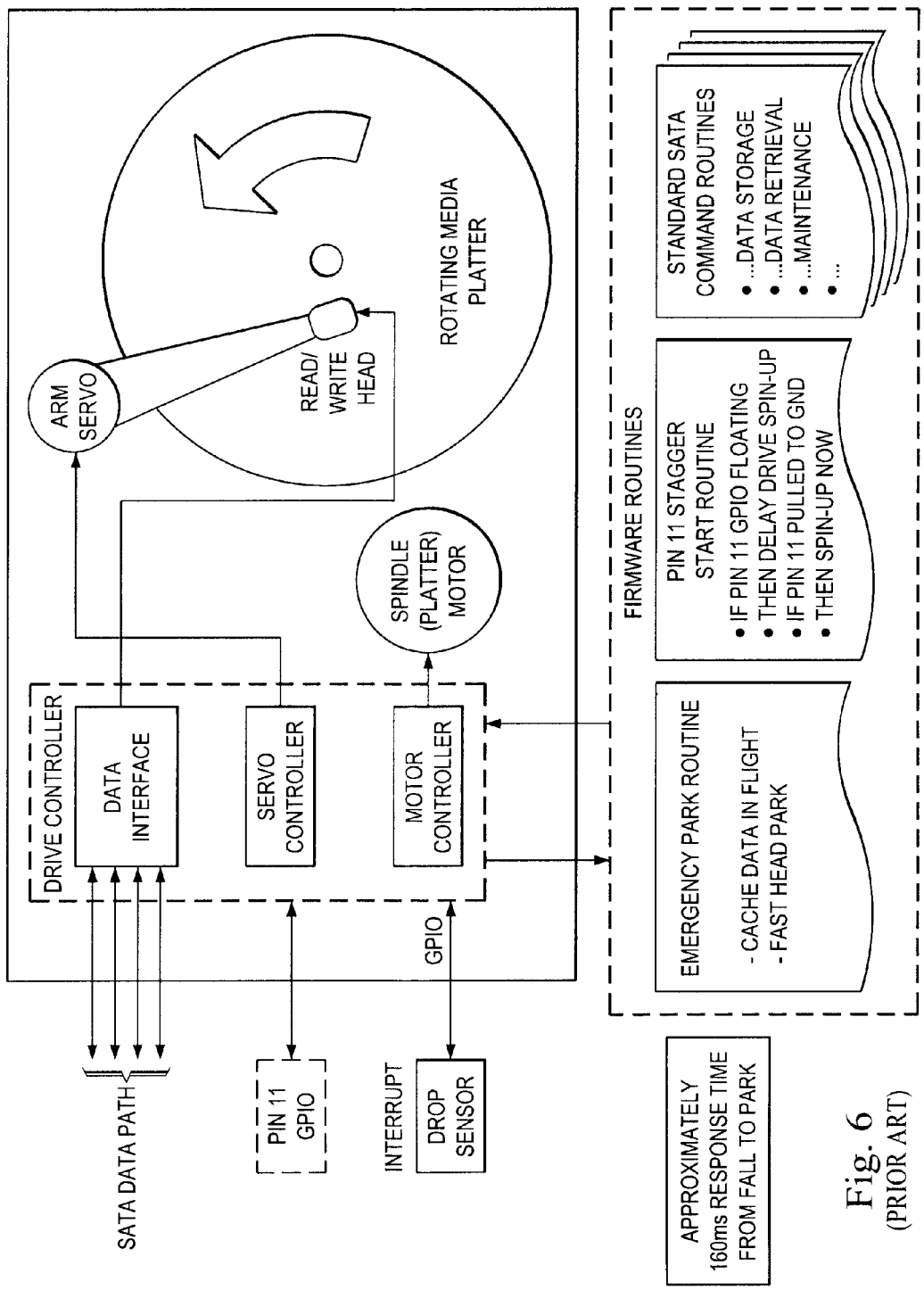
FIG. 6 illustrates a prior art embodiment of an internal drop sensor in an HDD.
Figure 7:
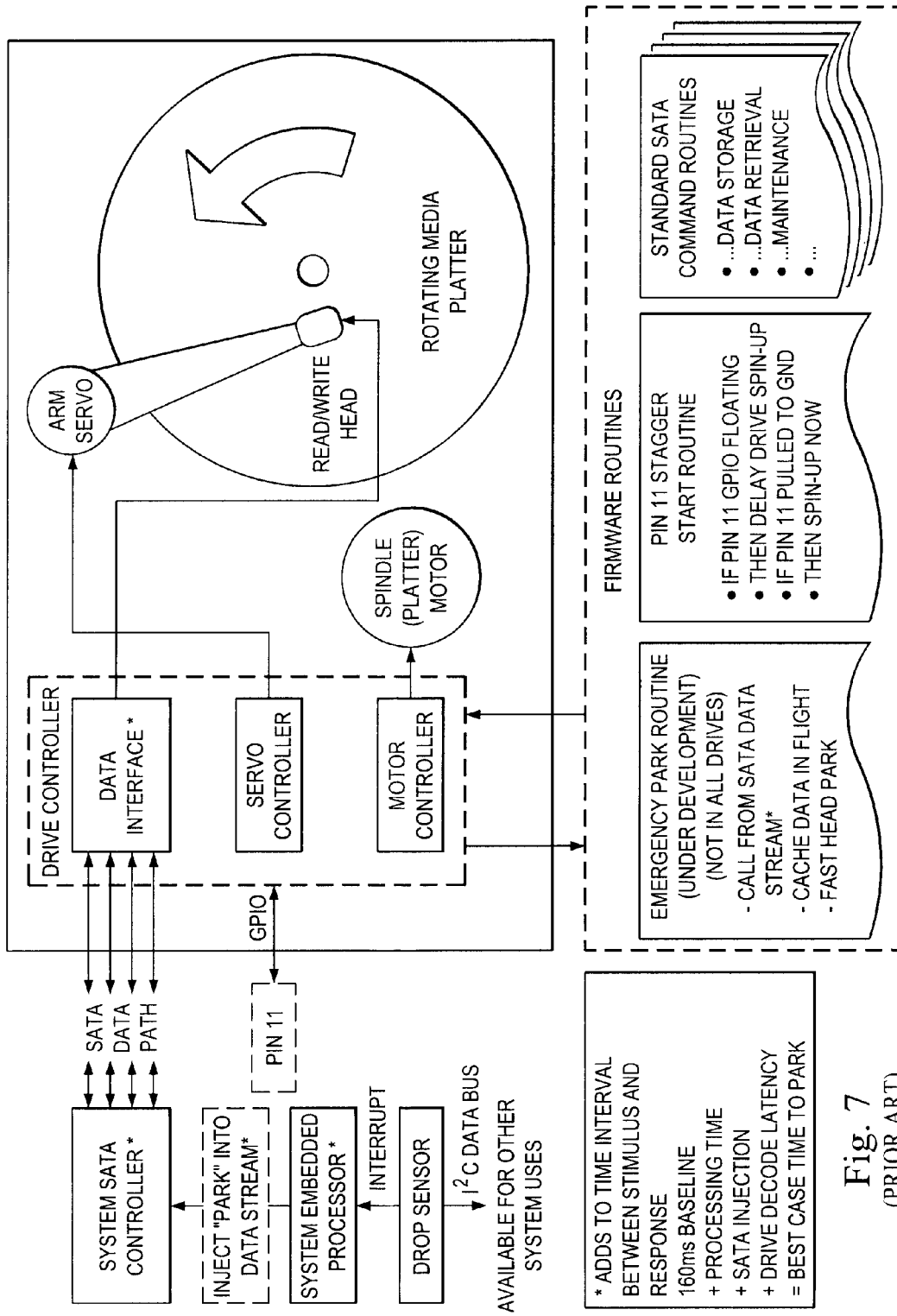
FIG. 7 illustrates a prior art embodiment of an external drop sensor using a standard SATA communication data path interface.

Firmware routines 160 are also shown in FIG. 2. Exemplary firmware routines 160 are the emergency park routine 162, the pin 11 stagger start routine 164 and the standard SATA command routines 166. Standard SATA command routines 166 will operate in embodiments of the present disclosure substantially similar to like routines for other HDDs, as can be seen in FIGS. 6 and 7. However, the pin 11 stagger start routine 164 and the emergency park routine 162 of the present disclosure operate differently than that of the prior shown in FIGS. 6-7 after the POST and the BIOS 132 re-maps or redefines the operation of pin 11, 116A of the HDD 116, as shown in at 194 in FIG. 4. In an embodiment, the pin 11 stagger start routine 164 still follows the SATA standard routine for spinning-up the media platter 154 via the motor 152 and the motor controller 150 when pin 11 GPIO 116A is pulled to ground. However, the stagger start routine 164 no longer performs the SATA standard delayed spin-up when the pin 11 GPIO 116A is triggered after the BIOS 132 re-defines the function of the pin 11 GPIO 116A at 194. Instead a non-grounded (floating or active 3.3 v) pin 11 GPIO 116A causes the emergency park routine 162 to quickly cache any information in flight to or from the HDD 116 and park the head 144 and the arm 149 away from the media platter 154.

Figure 3:
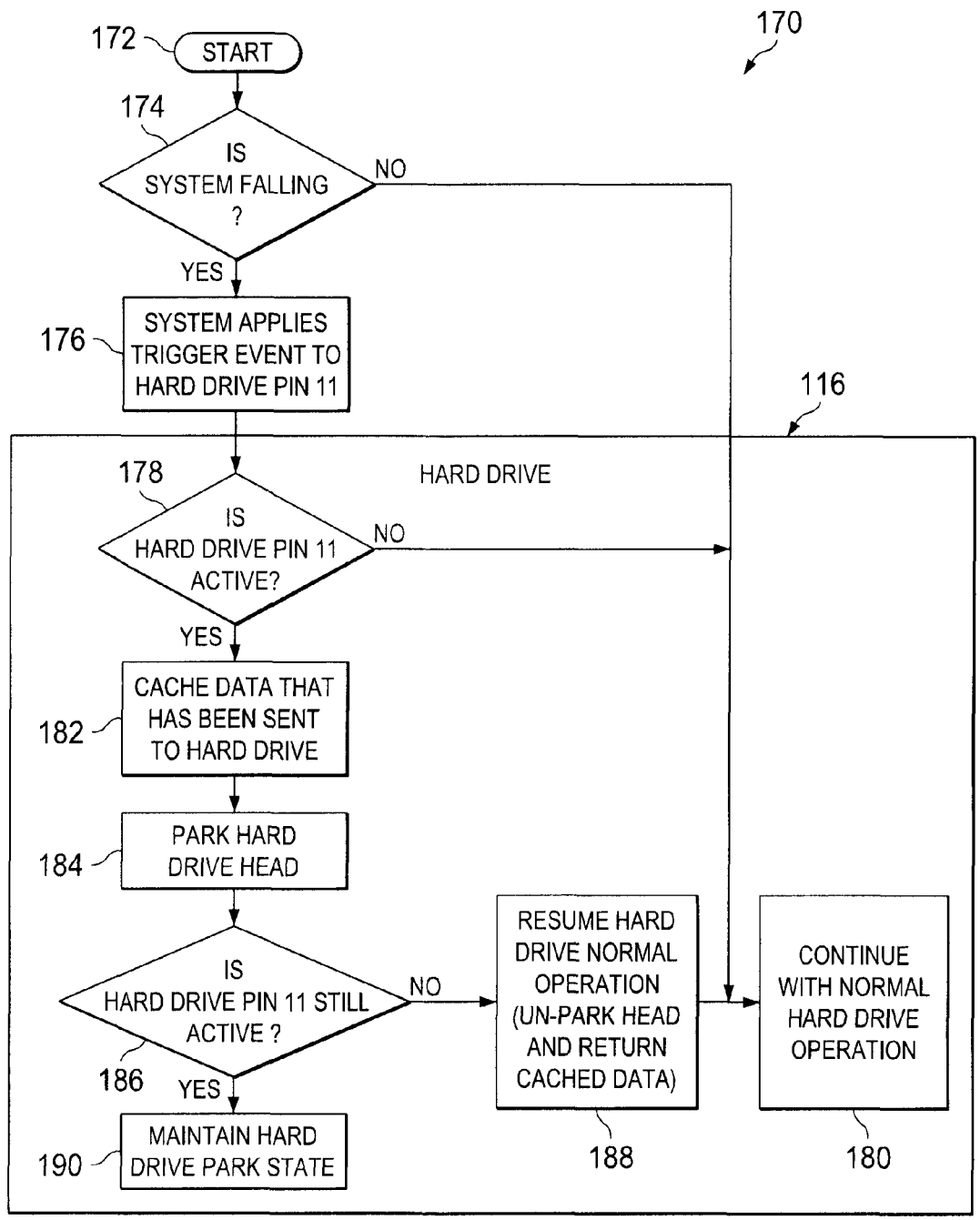
FIG. 3 illustrates a flowchart of an embodiment of a method to protect data and a data storage device of an IHS during a fall according to an embodiment of the present disclosure.

FIG. 3 illustrates a flow chart of an embodiment of a method 170 to protect information and the HDD 116 during a drop or fall. The method 170 starts at 172 where the IHS 100 is operating after the POST and after the re-mapping of the GPIO (e.g., pin 11 of the HDD 116) 116A. It is noted that any input to the HDD 116 may be used for the interrupt trigger 136 to signal that the IHS 100 is falling. The method 170 proceeds to decision block 174 to determine whether the IHS 100 is falling. In an embodiment, this decision is made depending on whether the pin 11 GPIO 116A is electrically ground or not as described with respect to the emergency park routine 162. If no, the method 170 determines that the IHS 100 is not falling, the method 170 proceeds to block 180 where the IHS 100 continues with normal HDD 116 operation. On the other hand, if yes, the method 170 determines that the IHS 100 is falling, the method 170 proceeds to block 176 where the method 170 performs an interrupt trigger 136 to pin 11 GPIO 116A of the HDD 116. The method 170 then proceeds to decision block 178 where the method 170 determines whether pin 11 GPIO 116A is active (e.g., electrically not ground). If no, the method 170 determines that pin 11 GPIO 116A is not active, the method 170 proceeds to block 180. On the other hand, if yes, the method 170 determines that pin 11 GPIO 116A is active, the method 170 proceeds to block 182 where the drive controller 140 of the HDD 116 caches data that has been sent to or from the HDD 116. The method 170 then proceeds to block 184 where the drive controller 140 of the HDD 116 instructs the servo controller 146 to park the drive head 144 away from the media platter 154. Then, the method 170 proceeds to decision block 186 to determine whether the pin 11 GPIO 116A is still active or not. If no, the method 170 determines that the pin 11 GPIO 116A is not still active, the method 170 proceeds to block 188 where the HDD 116 resumes normal operation and then continues normal operation at block 180. On the other hand, if yes, the method 170 determines that the pin 11 GPIO 116A is still active, the method 170 proceeds to block 190 where the method 170 maintains the HDD 116 in the emergency parked state.

In an embodiment, fall sensor 134 is incorporated into the IHS 100 at a system level using an interrupt signal as the interrupt trigger 136 to the HDD 116 to activate the emergency head park routine 162. It is contemplated that embodiments of the present disclosure are to be used in high-end as well as in lower-end commodity HDDs 116. As should be understood, high volume usage of the present disclosure may allow for lower commodity pricing. The fall sensor 134 may also be utilized as a general IHS 100 system level sensor for free fall protection which may be incorporated on many HDDs 116. In practice, using an accelerometer as the fall sensor 134 that is directly coupled to the HDD as an interrupt allows for a less than 160 ms response time or approximately 5" worth of fall to react.

The traditional SATA HDD specification defines pin 11, 116A of the traditional power connector for an HDD (e.g., HDD 116) as an HDD general purpose input/output (GPIO) pin. Per the SATA specification, the specified purpose of this pin, 116A is for a delayed HDD spin-up (input) (e.g., when multiple HDDs are used in an IHS to reduce electrical start-up current when the spindle motors 152 start) and as an HDD activity drive circuit for an external LED (output) when the HDD 116 is active. In a notebook type IHS (e.g., IHS 1000) it is not common practice in the art to utilize the pin 11, 116A to stagger spin-up of the HDD 116 because most notebook type IHSs have only one HDD 116. Therefore, in the present disclosure the input function of pin 11, 116A of a SATA HDD 116 is to be utilized as an interrupt trigger 136 to initiate an emergency read/write head park routine 162. In this fashion, the fall sensor 134 (e.g., an accelerometer) can be mounted on the motherboard of a notebook type IHS (e.g., the IHS 100). In an embodiment, the fall sensor 134 is connected to one of the embedded system processors for programming a trip threshold. Then, the fall sensor 134 is utilized to detect a system free fall event. Upon detection of a fall of the IHS 100, the sensor output pin will output an interrupt trigger 136 to activate the input pin 116A on the HDD 116. This activation will instigate the emergency read/write head park routine within the HDD 116. In an embodiment, a direct interrupt to the HDD 116 is used if the free fall sensor 134 is embedded on the system side.

In an embodiment, the firmware of an HDD 116 is modified with an emergency park routine 162 that is similar to emergency park routines utilized in traditional high performance HDDs having internal fall sensors, such as the one shown in FIG. 6. This emergency park routine 162 is instigated upon activation of the pin 11 GPIO 116. In an embodiment, an interrupt trigger input to the pin 11 GPIO 116 will interrupt all HDD activity, cache data in flight and immediately move the read/write head 144 off of the media platter 154 to its park position.

In industry, many lower priced HDDs (e.g., HDD 116) have all necessary hardware hooks and etc. to enable pin 11, 116A as an interrupt pin. In an embodiment, these HDDs (e.g., HDD 116) can be manufactured with specific proprietary firmware that incorporates an emergency park routine (e.g., emergency park routine 162). The emergency park routine 162 may be activated by the fall sensor 134, and thus trigger the emergency park routine 162 that is internal to the HDD 116. This emergency park routine 116 may be remapped for external activation by the pin 11 GPIO 116A. Conventional HDDs can be used with the present disclosure as long as a non-ground connection to pin 11, or other GPIO pin, is used for an interrupt trigger 136. In an embodiment, the HDD firmware discussed herein can be used in non-sensor enabled IHS systems so that the firmware is backwards compatible with the non-sensor enabled IHS systems. It should be understood by those having ordinary skill in the art that using a system fall sensor, such as the fall sensor 134, allows a computer manufacturer to control the algorithm for using the sensor, thereby providing a consistent user experience. In addition, a system side algorithm allows for user interaction of the trigger sensitivity.

Embodiments of the systems provided herein provide a portable IHS (e.g., IHS 100) HDD (e.g., HDD 116) that has an external pin (e.g., pin 11) that allows for a hardware based head park command to the HDD in the event of a free fall. An accelerometer (e.g., free fall sensor 134) is placed in the system. In the event of a fall, a trigger pin on the accelerometer interfaces with the HDD via the external pin on the drive connector. The trigger event caches storage data that is in flight and retracts and parks the HDD read/write head (e.g., head 144). Accordingly, this system allows for an extremely fast retraction of the hard drive head if the IHS falls. However, this system only enables fast free fall detection and reaction in a system that has the external pin enabled HDD with the IHS manufacturer's modified firmware to re-define the HDD GPIO (e.g., pin 11). In practice, it can be assumed that some legacy drives (e.g., HDDs without the external pin enabled) will be installed into these IHSs. In other words, as an HDD fails, an IT department may replace the defective drive with any SATA drive (e.g., one without the external pin enabled) in the department inventory. Thus, further embodiments provided herein provide IHS free fall protection with both the faster response interrupt drive system, such as that provided in FIG. 2, and with a SATA data bus communicated HDD park system.

In light of the above, additional embodiments provided herein disclose an IHS having multiple systems to detect a system free fall event and force the HDD head to a safe and parked position. Thus, systems with a conventional SATA HDD may also have free fall protection. In an embodiment this is achieved with a system that implements a free fall sense system and method that enables both the external triggered interrupt to the HDD and a conventional park routine that is serviced through the SATA channel. In an embodiment, an accelerometer (e.g., free fall sensor 134) is mounted to an IHS system. The sensor may be mounted to a motherboard of the IHS in the proximate area of the HDD. The accelerometer may include two trigger pins that are activated when a free fall event occurs. One of the trigger pins is connected to the hard drive external "head park" command pin (e.g., the HDD SATA Pin 11) of a free fall sense enabled HDD. The second accelerometer trigger pin is connected to a system GPIO pin. This pin can be a pin on a system embedded controller or it can be a GPIO pin on a processor companion chip (e.g., a chipset PCH). The system GPIO pin will trigger a sending of a park command string to the drive via the SATA bus to the HDD. As the IHS performs a POST, the system BIOS will query the HDD for a drive identification. The drive may include an IHS manufacturer unique identifier to identify the HDD. The HDD may respond to the BIOS with its identification code. In an embodiment, part of the identification string will include an identifier that the drive is external trigger free fall sensing compatible. If the HDD is free fall sensing compatible, a command is sent to the HDD to enter a free fall sensing compatibility mode. The HDD will then be re-mapped to respond to external trigger events on a pre-determined GPIO, such as on pin 11 of the SATA HDD. When the system identifies the HDD as free fall sensing compatible, the system routine that sends head park commands via the SATA channel will be disabled. On the other hand, if the drive identification query responds with a string that is not external trigger free fall sensing compatible, the system will enable the routine that initiates a head park via the SATA bus. Accordingly, using these systems and methods, substantially all HDDs that can be installed in the IHS will have free fall protection.

Figure 8:
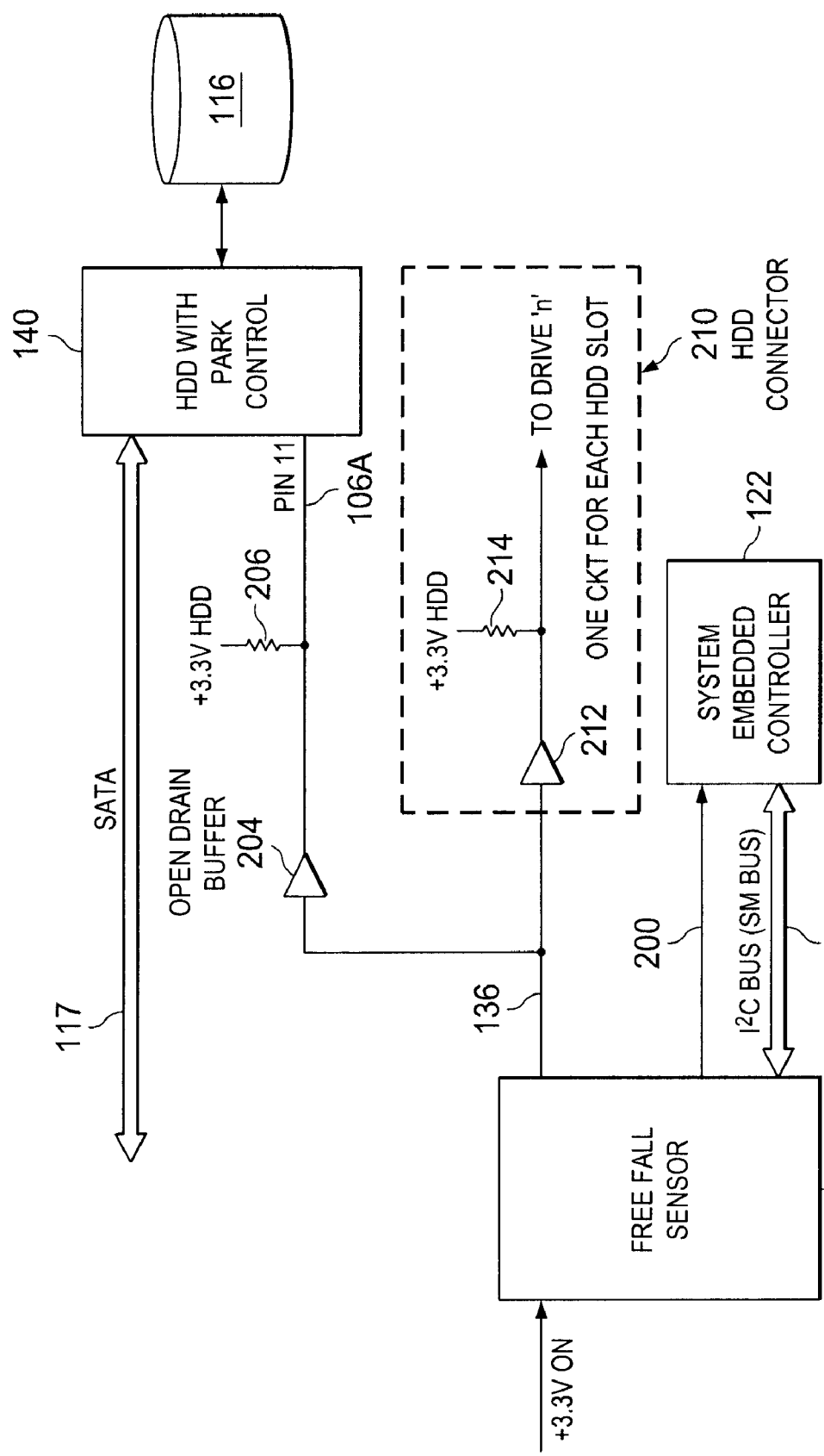
FIG. 8 illustrates a block diagram of an embodiment of an HDD coupled with an external drop sensor to sense falling of an IHS having dual path sensing according to an embodiment of the present disclosure.

FIG. 8 illustrates a block diagram of an embodiment of an HDD 116 coupled with an external drop sensor 134 to sense falling of an IHS 100 having dual path (e.g., interrupt trigger signal 136 path to the HDD 116 and interrupt trigger signal 200 path to the system controller 122) configured to sense falling of the IHS 100 according to an embodiment of the present disclosure. This embodiment includes the interrupt trigger signal 136 being powered by a voltage source, such as an approximately 3.3 VDC power source and originating with the free fall sensor 134 and traveling to a GPIO (e.g., pin 11 of the HDD 116 to indicate free fall and initiate a cache and park situation for the HDD 116. However, this system includes an open drain buffer circuit 204 and a pull up resistor 206 along the path for the interrupt trigger signal 136. The voltage source is generally on (e.g., providing approximately 3.3 VDC to the sensor 134 any time free falling is to be detected. This may be any time that the IHS 100 is powered on. The open drain buffer circuit 204 may be internal to the sensor 134 or may be included in the path between the sensor 134 and the HDD GPIO 116A. In an embodiment, the open drain buffer 204 is a field effect transistor (FET) device. However, other devices may be used for the open drain buffer 204. The pull up resistor 206 is between a voltage source (e.g., an approximately 3.3 VDC power source) and the interrupt trigger signal 136 path. The pull up resistor 206 may be included internally with the HDD 116 and may not be necessary. In an embodiment, the voltage supply coupled to the pull up resistor 206 may be powered only when the HDD 116 is operating.

As shown in FIG. 8, the interrupt trigger signal 136 also travels to pin "n" of an HDD connector 210 via an open drain buffer circuit 212 coupled with a pull up resistor 214. In an embodiment, the pull up resistor 214 is coupled to a voltage source of approximately 3.3 VDC where the circuit (e.g., buffer 212 and pull up resistor 214) is coupled to a GPIO (e.g., pin 11) of one or more HDDs and operates substantially the same as that for the interrupt trigger signal 136 discussed above to the HDD 116. As should be understood, other connections are provided for the HDD connector 210 to accommodate data storage, retrieval, power, and maintenance operations. Accordingly, any number of HDDs may be coupled with the systems of the present disclosure using a plurality of HDD connectors (e.g., 210) substantially the same as the HDD connector 212.

Generally, the interrupt trigger signal 136 shown in FIG. 8 is an active high (e.g., digital logic 1) when free fall is detected. This allows pin 11 GPIO 116A to be pulled high. Pin 11 GPIO 116A is driven low on power up of the IHS 100 and then held low unless a free fall is sensed by the sensor 134. In other words, in legacy mode, this system ignores a non-ground 136 signal at pin 11 GPIO 116A after IHS 100 startup POST. Additionally, the open drain buffer 204 allows pin 11 GPIO 116A to stay at electrical ground. As such, this system uses that concept to react to a fall when the interrupt trigger signal is not at electrical ground. When the system receives a high (e.g., digital logic 1) signal at pin 11 GPIO 116A from the interrupt trigger signal 136, the system performs an unload sequence for the HDD 116.

FIG. 8 also illustrates the additional interrupt trigger signal 200 communicated between the free fall sensor 134 and the system controller 122. This interrupt trigger signal 200 is used for systems where legacy drives are discovered by the BIOS of the IHS to park the read/write head of the legacy drive. Additionally, the system includes the I²C (SM) data bus 138 coupled between the free fall sensor 134 and the controller 122. The data bus 138 is used as a control and configuration bus that may be used for providing enablement to the system, running self tests, and setting trigger thresholds. The data bus 138 may be used for these and other uses in the IHS 100. Accordingly it should be readily understood that the systems of the present disclosure may be used with IHS manufacturer specific HDDs and also with legacy HDDs.

Figure 9B:
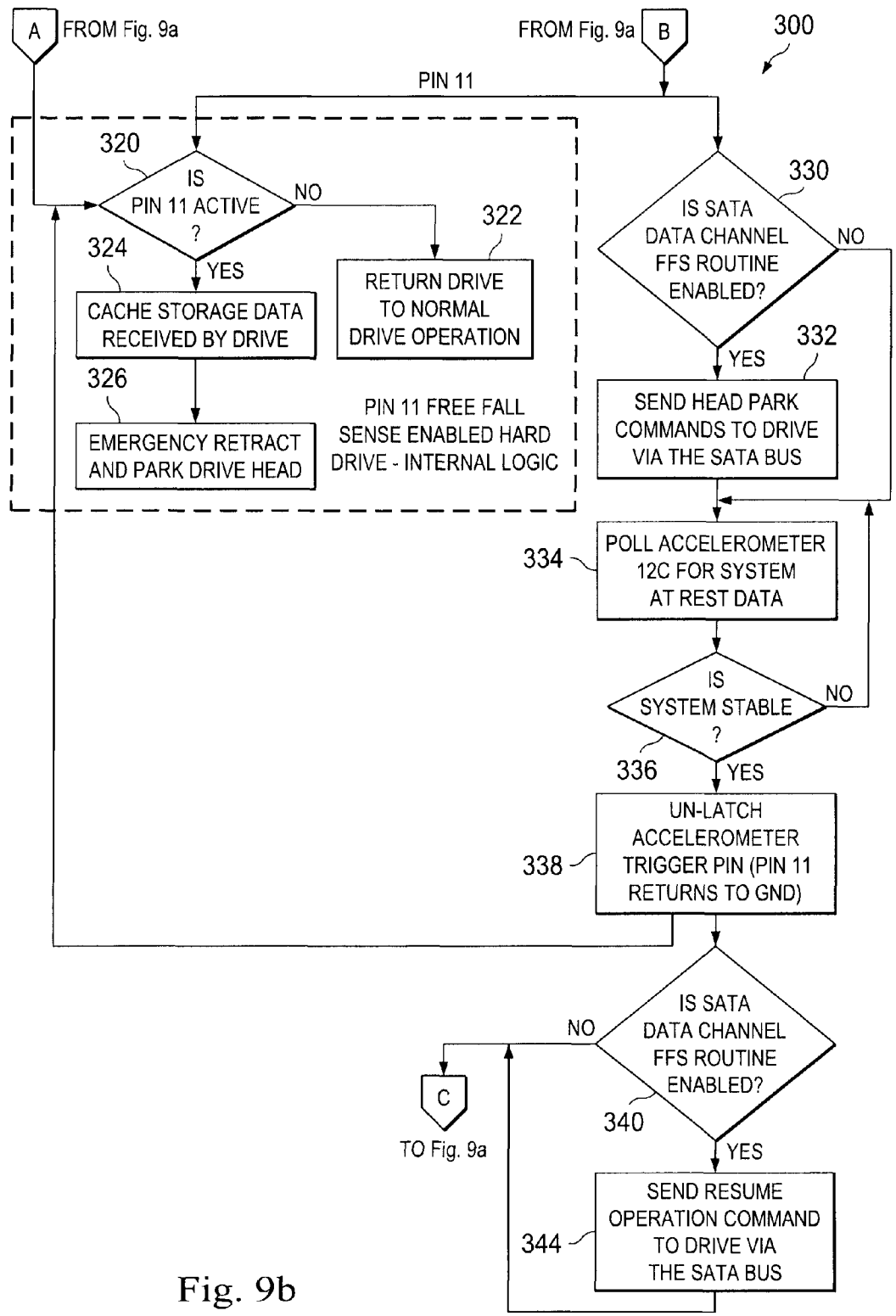

FIGS. 9a and 9b illustrate a flowchart of an embodiment of a method 300 to protect data and a data storage device (e.g., HDD 116) during a fall of the an IHS (e.g., IHS 100) having dual path sensing according to an embodiment of the present disclosure. The method 300 begins at block 302 where the IHS 100 is operating in a POST mode. The method 300 continues to block 304 where the method 300 queries the HDD (e.g., HDD 116) for an IHS manufacturer specific identification (e.g., a DELL specific identification). The method continues to decision block 306 where the method 300 determines whether the HDD queried in block 304 is a pin 11 free fall sensor enabled HDD. If no, the HDD is not a pin 11 free fall sensor enabled HDD, the method 300 proceeds to block 308 where the method 300 enables an operating system driver routine to trigger an HDD park routine via the SATA bus 117. From block 308, the method 300 proceeds to block 314, which is described in more detail below. Back now to decision block 306, if yes, the HDD is a pin 11 free fall sensor enabled HDD, the method 300 proceeds to block 310 where the method 300 sends a SATA command to the HDD (e.g., HDD 116) to switch or remap from standard SATA drive park enablement to GPIO (e.g., pin 11 GPIO 116A) park enablement mode. The method 300 then proceeds to block 312 where the method 300 disables the operating system driver routine to park the HDD via the SATA bus (e.g., bus 117). From blocks 308 (as discussed above) and block 312 the method 300 proceeds to block 314 where the method 300 operates the IHS (e.g., IHS 100) in a standard operational mode, such as the primary operating system is running on the IHS.

The method 300 then proceeds to decision block 316 where the method 300 determines whether the free fall sensor (e.g., sensor 134) event is triggered, such as during a free fall event sensed by the free fall sensor. If no, the free fall sensor event is not triggered, the method 300 proceeds to block 317 where the method 300 keeps the HDD GPIO (e.g., pin 11 GPIO 116A) at electrical ground/inactive. The method 300 then continues at bubble 1, which is described in more detail below. Back now to decision block 316, if yes, the free fall sensor event is triggered, the method 300 proceeds to block 318 where the method latches the free fall sensor at a trigger active mode. In an embodiment, decision block 316 and blocks 317 and 318 are performed by the free fall sensor (e.g., sensor 134).

From bubble 1, the method 300 proceeds to block decision 320. Also, from block 318 the method 300 proceeds to decision block 320 and block 330. Block 330 is described in more detail below. At decision block 320 the method 300 determines whether the HDD GPIO (e.g., HDD pin 11 GPIO 116A) is active (e.g., receiving a logic 1 or high). If no, pin 11 is not active, the method 300 proceeds to block 322 where the method 300 returns the HDD to normal operation. On the other hand, if yes, pin 11 is active, the method 300 proceeds to block 324 where the method 300 caches storage data received by the HDD. The method 300 then proceeds to block 326 where the method 300 performs an emergency retract and parking of the read/write head (e.g., head 144). In an embodiment, decision block 320 and blocks 322, 324, and 326 are performed by a free fall sense enabled HDD (e.g., HDD 116) using internal logic.

Returning now to decision block 330, the method 300 determines whether a SATA data channel free fall sense routine is enabled for the IHS (e.g., IHS 100). If no, the SATA data channel free fall sense routine is not enabled, the method 300 proceeds to block 334, described in more detail below.

On the other hand, if yes, a SATA data channel free fall sense routine is enabled, the method 300 proceeds to block 332 where the method 300 communicates read/write head park commands to the HDD via the SATA bus (e.g., bus 117). The method 300 then proceeds to block 334 where the method 300 polls the free fall sensor for system at rest data. Next the method 300 proceeds to decision block 336 where the method 300 determines whether the system is stable. Considering if the system is stable according to decision block 336, a free fall event occurs over a period of time. In general, there is a fall, an impact, and a settling before the system comes to rest again. The system environment should be in a stable state before the HDD is returned to normal operation. Therefore, if no, the system is not stable, the method 300 returns to block 334. On the other hand, if yes, the system is stable, the method 300 proceeds to block 338 where the method 300 unlatches the free fall sensor GPIO (e.g., pin 11 GPIO 116A), which is allowed to return to electrical ground (e.g., low or logic 0). From block 338, the method 300 proceeds in parallel to bubble 1 and to decision block 340. At decision block 340 the method 300 determines whether the SATA data channel free fall sense routine is enabled. If no, the SATA data channel free fall sense routine is not enabled, the method 300 returns to block 314. On the other hand, if yes, the SATA data channel free fall sense routine is enabled the method 300 proceeds to block 344 where the method 300 sends a resume operation command to the HDD via the SATA bus (e.g., bus 117) and the method 300 then returns to block 314.

Thus, it should be readily understood that embodiments disclosed herein provide an IHS having an accelerometer programmed to latch in a trigger enabled (active) state upon detecting a free fall event. The device will remain latched until it receives a command from a system embedded controller to return to its normal operational state. This allows a system to "settle" after a fall/impact event. Upon a trigger event, the embedded controller will start polling the accelerometer via an I²C (SMBus) communication bus for acceleration readings. Once the system has become stable after such an event, the embedded controller will send a command via the I²C channel to unlatch the trigger pins and resume free fall detection. An externally triggered free fall sensing HDD will remain in its parked state as long as the interrupt pin is held active. When the trigger signal is removed from the input pin the HDD will return to its normal operational state. In a system with a conventional SATA HDD, a command string is sent via the SATA data bus to park the drive head when a free fall event occurs. The accelerometer trigger latch will be utilized as a hold for additional SATA command transmissions. The SATA driver stack will not allow for additional drive traffic while the accelerometer trigger is held in an active state. When the system embedded controller returns the trigger to its inactive state, the SATA driver will transmit a command to return the HDD to normal operation. Storage data traffic can then return to normal operation.

In an embodiment, the external trigger drive implementation uses pin 11 of the HDD power connector as the free fall sensing interrupt pin to the HDD. Per the SATA drive specification, pin 11 is defined for two functions. Accordingly, pin 11 may be used as an output pin to drive a hard drive activity LED. Also per the SATA specification, pin 11 may also be utilized as an input pin as the HDD initializes at start-up. If pin 11 is not strapped to electrical ground the HDD will not spin up. This feature is used for staggered start-up on multiple drive systems. An embodiment illustrated in FIG. 8 holds pin 11 GPIO 116A to electrical ground in a non-free fall sensing trigger state. This allows a conventional SATA HDD to spin up and is compatible with SATA recommendations. Additionally, the hardware based drive park system is not operating system dependent. A system that utilizes a SATA driver to enable a park command uses software that sends commands via the SATA bus 117. The direct connection path of the accelerometer trigger pin to the exposed HDD pin 11 GPIO 117 bypasses operating system dependencies. Thus, no special drivers are needed if the IHS 100 is utilizing an alternative operating system.

As should be understood a benefit of the present disclosure is to enable free fall HDD protection in notebook IHSs at lower commodity HDD pricing. In addition, the fall sensor 134 is incorporated at a system level so that the accelerometer can be utilized for other system level orientation and vibration detect routines. It is believed that IHS systems that ship with free fall sensing HDD protection have a lower data corruption and lower shock failure rates than HDD systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data storage system comprising:
a hard disk drive (HDD), the HDD including:
a rotatable media platter operable to receive and store data;
a read/write head operable to communicate with the media platter by writing data to the media platter and by reading the data from the media platter;
an arm supporting the read/write head;
a motor coupled to the arm and operable to move the arm to and from the media platter;
a drive controller operable to control the media platter, the read/write head and the servo motor, wherein the drive controller is configured to receive an interrupt trigger signal and, in response, perform an emergency routine to cache data and park the read/write head away from the media platter;
a general purpose input/output (GPIO) terminal coupled to the drive controller; and
a data interface terminal coupled to the drive controller;
wherein the HDD is configured to receive a query for drive identification and, in response, provide a drive identifier; and
a fall sensor communicatively coupled to the drive controller and configured to send the interrupt trigger signal to the drive controller when the drive is detected as falling, wherein the interrupt trigger signal is sent via the GPIO terminal when the drive identifier indicates that the HDD is in a first free fall sense mode, and wherein the interrupt trigger signal is sent via the data interface terminal when the drive identifier indicates that the HDD is in a second free fall sense mode.

2. The system of claim 1, wherein one or more subsystems that send the interrupt trigger signal via the data interface terminal are disabled when the drive identifier indicates that the HDD is in the first free fall sense mode.

3. The system of claim 1, wherein the HDD is a Serial Advanced Technology Attachment (SATA) type data storage device.

4. The system of claim 1, wherein when fall sensor sends the interrupt trigger signal using a first output when sending the interrupt trigger signal via the GPIO terminal, wherein the fall sensor sends the interrupt trigger signal using a second output when sending the interrupt trigger signal via the data interface terminal, and wherein the first and second outputs are different outputs.

5. The system of claim 1, wherein an electrical ground received at the GPIO terminal before a power-on self test (POST) causes the drive controller to delay a spin-up of the media platter, and wherein a non-ground electrical signal received at the GPIO terminal after the POST causes the emergency routine to cache data and park the read/write head away from the media platter.

6. The system of claim 1, wherein one or more subsystems that send the interrupt trigger signal are remapped from the data interface terminal to the GPIO terminal when the drive identifier indicates that the HDD is in the first free fall sense mode.

7. The system of claim 1, wherein the GPIO terminal includes pin 11 on a Serial Advanced Technology Attachment (SATA) type HDD.

8. An information handling system (IHS) comprising:
a processor;
a memory module communicatively coupled to the processor; and
a a hard disk drive (HDD) including:
   a rotatable media platter operable to receive and store data;
   a read/write head operable to communicate with the media platter by writing data to the media platter and by reading the data from the media platter;
   an arm supporting the read/write head;
   a motor coupled to the arm and operable to move the arm to and from the media platter;
   a drive controller operable to control the media platter, the read/write head and the servo motor, wherein the drive controller is configured to receive an interrupt trigger signal and, in response, perform an emergency routine to cache data and park the read/write head away from the media platter;
   a general purpose input/output (GPIO) terminal coupled to the drive controller; and
   a data interface terminal coupled to the drive controller;
   wherein the HDD is configured to receive a query for drive identification and, in response, provide a drive identifier; and
a fall sensor communicatively coupled to the drive controller and configured to send the interrupt trigger signal to the drive controller when the drive is detected as falling, wherein the interrupt trigger signal is sent via the GPIO terminal when the drive identifier indicates that the HDD is in a first free fall sense mode, and wherein the interrupt trigger signal is sent via the data interface terminal when the drive identifier indicates that the HDD is in a second free fall sense mode.

9. The IHS of claim 8, wherein one or more subsystems that send the interrupt trigger signal via the data interface terminal are disabled when the drive identifier indicates that the HDD is in the first free fall sense mode.

10. The IHS of claim 9, wherein the HDD is a Serial Advanced Technology Attachment (SATA) type data storage device.

11. The IHS of claim 9, wherein when fall sensor sends the interrupt trigger signal using a first output when sending the interrupt trigger signal via the GPIO terminal, wherein the fall sensor sends the interrupt trigger signal using a second output when sending the interrupt trigger signal via the data interface terminal, and wherein the first and second outputs are different outputs.

12. The IHS of claim 9, wherein an electrical ground received at the GPIO terminal before a power-on self test (POST) causes the drive controller to delay a spin-up of the media platter, and wherein a non-ground electrical signal received at the GPIO terminal after the POST causes the emergency routine to cache data and park the read/write head away from the media platter.

13. The IHS of claim 9, wherein one or more subsystems that send the interrupt trigger signal are remapped from the data interface terminal to the GPIO terminal when the drive identifier indicates that the HDD is in the first free fall sense mode.

14. The IHS of claim 9, wherein the GPIO terminal includes pin 11 on a Serial Advanced Technology Attachment (SATA) type HDD.

15. A method comprising:
querying a hard disk drive (HDD) for a drive identifier;
determining whether the HDD is in a first free fall sense mode or a second free fall sense mode using the drive identifier;
detecting whether the HDD is falling; and
in response to detecting that the HDD is falling, communicating an interrupt trigger signal to the HDD, wherein the interrupt trigger signal is sent to a general purpose input/output (GPIO) terminal of the HDD when the drive identifier indicates that the HDD is in the first free fall sense mode, and wherein the interrupt trigger signal is sent to a data interface terminal of the HDD when the drive identifier indicates that the HDD is in the second free fall sense mode.

16. The method of claim 15, further comprising:
receiving the interrupt trigger signal; and
in response to receiving the interrupt trigger signal, performing an emergency routine to cache data and parking a read/write head in the HDD away from a media platter in the HDD.

17. The method of claim 16, further comprising:
determining whether the HDD is in a stable mode after the detection of the falling of the HDD; and
returning the HDD to normal operation.

18. The method of claim 15, wherein the detecting whether the HDD is falling is performed using a three-axis accelerometer.

19. The method of claim 15, further comprising:
communicating the interrupt trigger signal to an additional HDD using a buffered pull-up circuit connector.

20. The method of claim 15, further comprising:
communicating the interrupt trigger signal via the data interface terminal as a Serial Advanced Technology Attachment (SATA) type communication signal.

* * * * *